United States Patent
Phuah et al.

(10) Patent No.: US 8,233,486 B2
(45) Date of Patent: Jul. 31, 2012

(54) REMOTE MANAGEMENT OF NETWORK DEVICES

(75) Inventors: Vincent Phuah, Waltham, MA (US); Andrew F. Patka, Holliston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1139 days.

(21) Appl. No.: 11/953,977

(22) Filed: Dec. 11, 2007

(65) Prior Publication Data

US 2008/0137673 A1    Jun. 12, 2008

Related U.S. Application Data

(60) Provisional application No. 60/869,457, filed on Dec. 11, 2006.

(51) Int. Cl.
*H04L 12/56* (2006.01)

(52) U.S. Cl. ..................................... 370/395.2

(58) Field of Classification Search .................. 370/401, 370/395.2, 389
See application file for complete search history.

(56) References Cited

U.S. PATENT DOCUMENTS 5,649,108 A * 7/1997 Spiegel et al. ............... 709/241
7,457,293 B2 * 11/2008 Kokado ....................... 370/392
2002/0110123 A1 * 8/2002 Shitama ....................... 370/389
2004/0022258 A1 * 2/2004 Tsukada et al. .............. 370/401
2006/0291443 A1 * 12/2006 Harrington et al. .......... 370/351

OTHER PUBLICATIONS

J. Rosenberg et al., "STUN—Simple Traversal of User Datagram Protocol (UDP) Through Network Address Translators (NATs)," Network Working Group, Request for Comments 3489, Mar. 2003, 47 pages.

Jeff Bernstein et al., "CPE WAN Management Protocol," DSLHome-Technical Working Group; DSL Forum TR-069, May 2004, 109 pages.

Jeff Bernstein et al., "Applying TR-069 to Remote Management of Home Networking Devices," DSLHome-Technical Working Group, Technical Report DSL Forum TR-111, Dec. 2005, 24 pages.

* cited by examiner

*Primary Examiner* — Man Phan
*Assistant Examiner* — Kevin Lee (57) ABSTRACT

A device receives an activation inform message associated with a local area network (LAN) device, and verifies the LAN device and a gateway device associated with the LAN device based on an Internet protocol (IP) address included in the activation inform message. The device also performs a set parameter value (SPV) operation to add a new connection request port forwarding entry in the gateway device when the LAN device and the gateway device are verified, and sends a connection request operation, to be forwarded by the gateway device to the LAN device, based on the new connection request port forwarding entry.

18 Claims, 10 Drawing Sheets

REMOTE MANAGEMENT OF NETWORK DEVICES

RELATED APPLICATION

This application claims priority under 35 U.S.C. §119 based on U.S. Provisional Patent Application No. 60/869,457, filed Dec. 11, 2006, the disclosure of which is incorporated by reference herein in its entirety.

BACKGROUND

The DSL Forum (i.e., a consortium of leading industry players covering telecommunications, equipment, computing, networking and service provider companies) develops and maintains a set of standards for remote management of devices (e.g., customer premises equipment (CPE) or local area network (LAN) devices, such as set-top boxes and voice over Internet protocol (VoIP) telephones) provided in customer homes. One standard (e.g., TR-069) discusses remote management of CPE via protocols used for communication between CPE and an auto-configuration server (ACS). The ACS may provide secure auto-configuration, as well as other CPE management functions within a common framework.

Another standard (e.g., TR-111) extends the protocols for remote management of CPE to allow a management system to more easily access and manage devices connected via a LAN (i.e., LAN devices) through an Internet gateway device (e.g., a home router). Currently, Part 2 of TR-111 defines the use of Simple Traversal of User Datagram Protocol (UDP) Through Network Address Translators (NATs) (STUN) (e.g., as set forth by The Internet Engineering Task Force (IETF) in RFC 3489). STUN is mainly used as a mechanism to provide a connection request operation (e.g., initiated by an ACS, such as, a remote network management system) a way to reach a device attached to a NAT-enabled gateway device.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

STUN is a lightweight protocol that allows applications to discover the presence and types of NATs and/or firewalls between the applications and the public Internet. Generally, STUN is used for opening a "pinhole" on a NAT-enabled gateway device for communications initiated remotely by a software application. For example, a VoIP application in a home environment typically uses a STUN agent embedded in the application in order to support incoming calls. However, there are several drawbacks associated with using STUN for TR-069 CPE remote management. First, some home devices (e.g., legacy television set-top boxes) may have limited memory resources for incorporation of a STUN agent. Second, extraneous features (e.g., discovery of a NAT-enabled gateway device) in STUN may not be needed by CPE, in particular if the CPE (e.g., the gateway device) is already managed by the ACS. Finally, STUN presents potential security risks.

Implementations described herein may use port forwarding rules in a gateway device (e.g., a NAT-enabled gateway device) to provide a connection request operation (e.g., initiated by an auto-configuration server) a way to reach a device (e.g., a LAN device) attached to the gateway device. Implementations described herein may forgo use of STUN, may minimize unnecessary network traffic, may provide a more secure solution than STUN, and may permit use of a transmission control protocol (TCP) (e.g., as set forth in TR-069) for connection requests (e.g., as opposed to UDP used in STUN). For example, in one implementation, systems and/or methods described herein may receive an activation inform message associated with a LAN device, and may perform a set parameter value (SPV) operation to add a new connection request port forwarding entry in a gateway device associated with the LAN device. Once the connection request port forwarding entry is established in the gateway device, a connection request operation to a destined LAN device may be routed accordingly using the port forwarding entry.

In TR-069, a connection request may instruct the CPE to establish a Transmission Control Protocol/Internet Protocol (TCP/IP) connection to the ACS via an inform message. This may be followed by the ACS issuing one or more operations (e.g., a get parameter value (GPV) operation, a set parameter value (SPV) operation, etc.) to the CPE.

Figure 1:
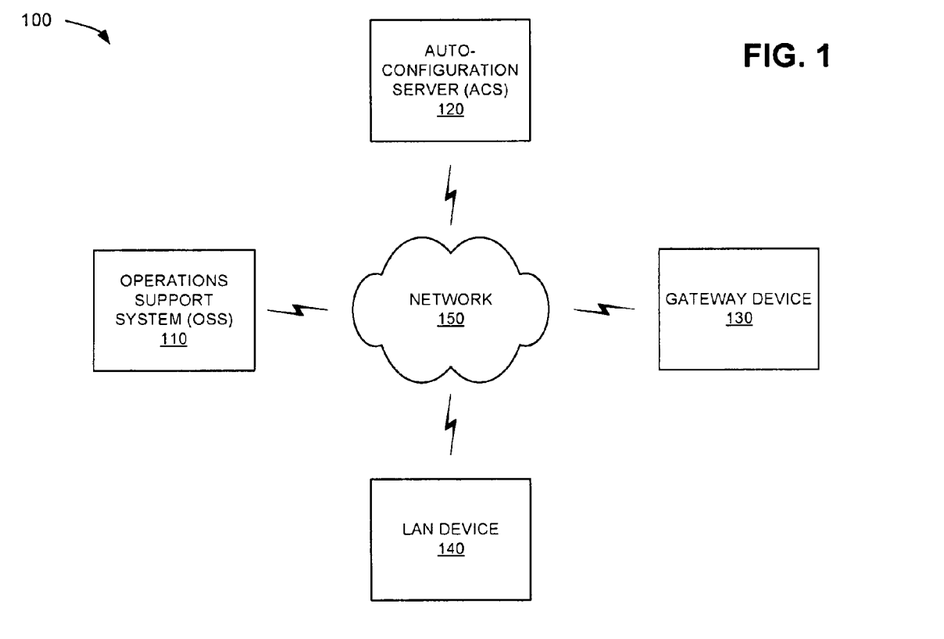
FIG. 1 is an exemplary diagram of a network in which systems and methods described herein may be implemented.

FIG. 1 is an exemplary diagram of a network 100 in which systems and methods described herein may be implemented. As illustrated, network 100 may include an operations support system (OSS) 110, an auto-configuration server (ACS) 120, a gateway device 130, and/or a local area network (LAN) device 140 interconnected by a network 150. OSS 110, ACS 120, gateway device 130, and/or LAN device 140 may connect to network 150 via wired and/or wireless connections. A single OSS, ACS, gateway device, LAN device, and network have been illustrated in FIG. 1 for simplicity. In practice, there may be more or different OSSs, ACSs, gateway devices, LAN devices, and/or networks. Also, in some instances, one or more of OSS 110, ACS 120, gateway device 130, and/or LAN device 140 may perform one or more functions described as being performed by another one or more of OSS 110, ACS 120, gateway device 130, and/or LAN device 140.

OSS 110 may include one or more server entities, or other types of computation or communication devices, that gather, process, search, and/or provide information in a manner described herein. For example, OSS 110 may include one or more servers (or systems) used by telecommunications service providers that support processes, such as maintaining network inventory, provisioning services, configuring network components, managing faults, dealing with customers, supporting processes such as taking orders, processing bills, collecting payments, etc. In one implementation, OSS 110 may enable ACS 120 to determine whether to use either the port forwarding described herein or the STUN approach for remote management of a particular LAN device (e.g., activating and de-activating the LAN device).

ACS 120 may include one or more server entities, or other types of computation or communication devices, that gather, process, search, and/or provide information in a manner described herein. In one implementation, ACS 120 may include a server (e.g., a computer system or an application) responsible for auto-configuration of customer premises equipment (e.g., LAN device 140) for advanced services. For example, ACS 120 may provide safe auto-configuration and control of CPE management functions (e.g., firmware image management, status and performance monitoring, diagnostics, connection requests, etc.) within an integrated framework. Further details of ACS 120 are provided below in connection with FIGS. 2-6.

Gateway device 130 may include a CPE device (e.g., a broadband network termination (B-NT), a broadband router, etc.), a data transfer device (e.g., a gateway, a router, a switch, a firewall, a network interface card (NIC), a hub, a bridge, a proxy server, or some other type of device that processes and/or transfers data), etc. In one example, gateway device 130 may be capable of transmitting and/or receiving network traffic to LAN device 140.

LAN device 140 may include a CPE device, such as a private branch exchange (PBX), a set-top box, a router, a telephone, etc. A PBX may include a private telephone network that may be used within an organization. A set-top box may include a device that may connect to a communication channel (e.g., a cable television line) and may produce output on a television monitor. A set-top box may be used to receive and decode digital television broadcasts and provide the television broadcasts to a television monitor for display to a user. A router may include a device that forwards information to one or more computers. A telephone may include one or more types of telephone devices that are capable of providing telephony services (e.g., to the customer). For example, a telephone may include any devices capable of receiving VoIP services (e.g., from an IP network). In one implementation, LAN device 140 may include a LAN-based device that may use a dynamic host configuration protocol (DHCP) for private address assignment.

Network 150 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code-Division Multiple Access (CDMA), etc.), any network supporting VoIP services (e.g., a VoIP network with mobile and/or fixed locations, a wireline network, etc.), or a combination of networks.

Figure 2:
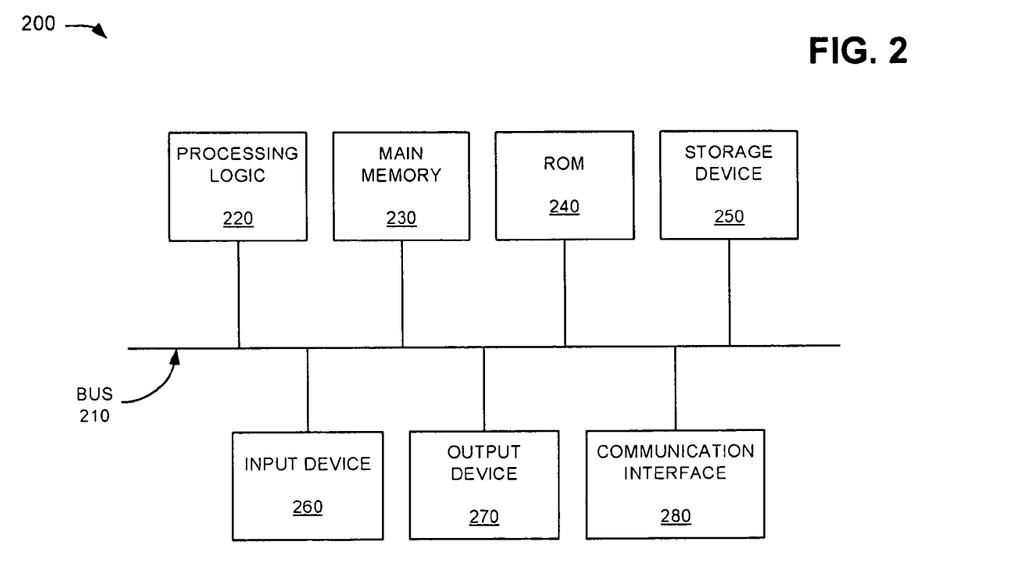
FIG. 2 illustrates exemplary components of an operations support system (OSS), an auto-configuration server (ACS), a gateway device, and/or a local area network (LAN) device of the network depicted in FIG. 1.

FIG. 2 is an exemplary diagram of a device 200 that may correspond to any of OSS 110, ACS 120, gateway device 130, and/or LAN device 140. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 150.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
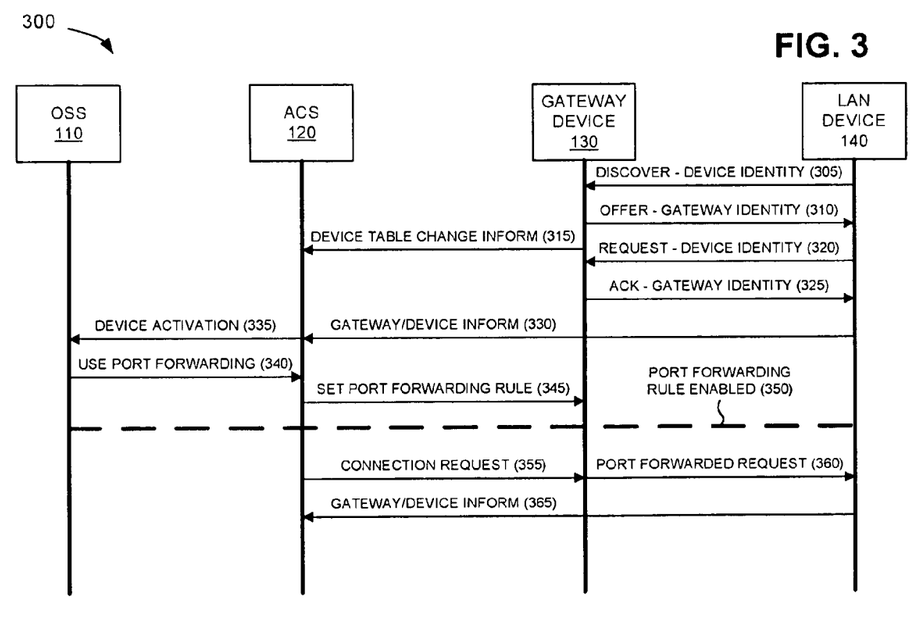
FIG. 3 depicts a message flow diagram of exemplary interactions between the OSS, the ACS, the gateway device, and/or the LAN device of the network illustrated in FIG. 1.

FIG. 3 depicts a message flow diagram 300 of exemplary interactions between OSS 110, ACS 120, gateway device 130, and/or LAN device 140. In one implementation, message flow diagram 300 may illustrate a process for enabling port forwarding for connection requests (e.g., for gateway device 130). As illustrated, LAN device 140 may forward a discover message 305 (e.g., that may provide an identity of LAN device 140) to gateway device 130, and gateway device 130 may respond to discover message 305 by forwarding an offer message (e.g., that may provide an identity of gateway device 130) to LAN device 140. Gateway device 130 may forward a device table change inform message 315 (e.g., that may provide information about LAN device 140) to ACS 120. LAN device 140 may forward a request message 320 (e.g., that may provide the identity of LAN device 140 (e.g., a private IP address issued by gateway device 130) and may request acknowledgment of the identity of gateway device 130) to gateway device 130. Gateway device 130 may respond to request message 320 by forwarding an acknowledgement message 325 (e.g., that may acknowledge the identity of gateway device 130) to LAN device 140.

As further shown in FIG. 3, LAN device 140 may forward an inform message 330 (e.g., that may provide information associated with gateway device 130 and/or LAN device 140, such as the IP addresses of gateway device 130 and/or LAN device 140) to ACS 120. If an IP address of inform message 330 has changed, ACS 120 may perform a verification of gateway device 130 and the associated LAN device 140 based on inform message 330. If gateway device 130 and LAN device 140 are verified, ACS 120 may send a device activation message 335 (e.g., that may provide information associated with gateway device 130 and/or LAN device 140) to OSS 110.

In one implementation, ACS 120, in conjunction with OSS 110, may determine whether to use either the port forwarding approach described herein or the STUN approach for remote management (e.g., activating and/or de-activating) of a particular LAN device (e.g., LAN device 140). OSS 110 may receive device activation message 335, and may instruct ACS 120 to use the port forwarding approach, via a use port forwarding instruction 340. ACS 120 may send a set port forwarding rule 345 (e.g., that may add a new port forwarding entry associated with LAN device 140) to gateway device 130. This may enable the port forwarding rule in gateway device 130, as indicated by reference number 350, and may permit a connection request operation 355 (e.g., initiated by ACS 120) destined to a selected LAN device (e.g., LAN device 140) to be forwarded correctly by gateway device 130. For example, gateway device 130 may receive connection request operation 355, and may forward the request as a port forwarded request 360, based on the port forwarding rule, to LAN device 140. LAN device 140 may respond to port forwarded request 360 by forwarding an inform message 365 (e.g., that may provide information associated with gateway device 130 and/or LAN device 140, such as the IP addresses of gateway device 130 and/or LAN device 140) to ACS 120.

Although FIG. 3 shows exemplary components and message types of message flow diagram 300, in other implementations, message flow diagram 300 may contain fewer, different, or additional components and/or message types than depicted in FIG. 3. In still other implementations, one or more components of message flow diagram 300 may perform one or more other tasks described as being performed by one or more other components of message flow diagram 300.

Figure 4:
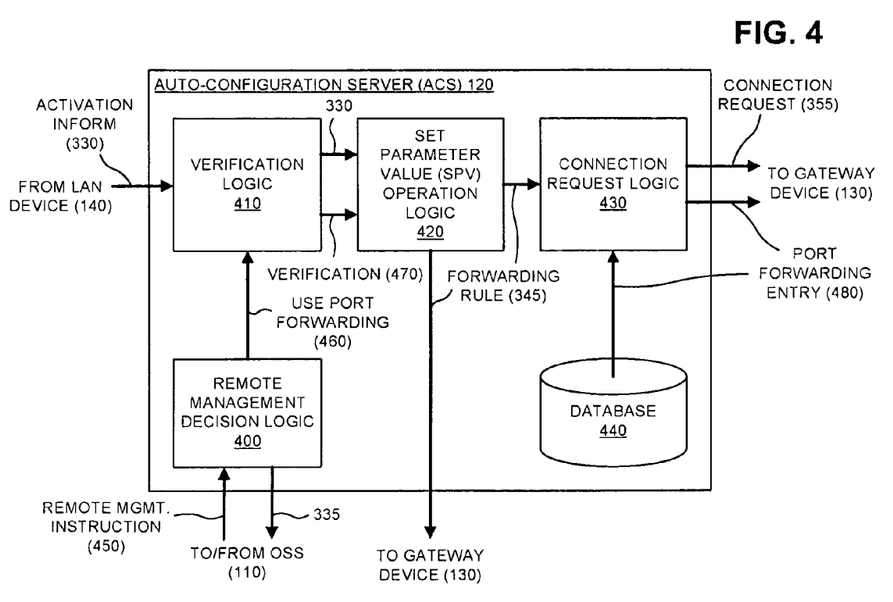
FIG. 4 illustrates an exemplary functional block diagram of the ACS of the network depicted in FIG. 1 during activation of a LAN device.

FIG. 4 illustrates an exemplary functional block diagram of ACS 120 during activation of a LAN device (e.g., LAN device 140). As illustrated, ACS 120 may include remote management decision logic 400, verification logic 410, set parameter value (SPV) operation logic 420, connection request logic 430, and a database 440. The functions described in FIG. 4 may be performed by one or more of the exemplary components of device 200 depicted in FIG. 2.

Remote management decision logic 400 may include any hardware and/or software based logic (e.g., processing logic 220) that may enable ACS 120 to determine whether to use the port forwarding approach described herein or the STUN approach for remote management of a particular LAN device 140. In one example, remote management decision logic 400 may provide device activation message 335 (e.g., that may provide information associated with gateway device 130 and/or LAN device 140) to OSS 110, and OSS 110 may receive device activation message 335. OSS 110 may provide a remote management instruction 450 (e.g., instructing whether to use port forwarding or STUN) to remote management decision logic 400. If OSS 110 instructs ACS 120 to use port forwarding, remote management instruction 450 may include use port forwarding instruction 340, and remote management decision logic 400 may provide verification logic 410 an instruction 460 to use port forwarding.

Verification logic 410 may include any hardware and/or software based logic (e.g., processing logic 220) that may enable ACS 120 to perform a verification of a gateway device and an associated LAN device. In one example, verification logic 410 may receive an activation inform message (e.g., inform message 330) associated with a LAN device (e.g., LAN device 140) and use port forwarding instruction 460, and may determine whether an IP address (e.g., for the LAN device) in the activation inform message has changed. If the IP address in the activation inform message has changed, verification logic 410 may perform a verification of gateway device 130 and the associated LAN device 140. If gateway device 130 and LAN device 140 are verified, verification logic 410 may provide verification information 470 (e.g., including information that gateway device 130 and LAN device 140 are verified) and activation inform message 330 to SPV operation logic 420.

In one implementation, the activation inform message may include active notification parameter attributes (e.g., InternetGatewayDevice.Management.Server.ManageableDevice and InternetGateway.Device.ManagementServer.ManageableDeviceNumberOfEntries), and both attributes may be set to true. For minimal network performance impact, ACS 120 may set a frequency of the active notification resulting from changes to a number of LAN device entries by setting a value of another parameter attribute (e.g., ManageableDeviceNotificationLimit) during LAN device activation or in the LAN device's default configuration file. Additionally and/or alternatively, ACS 120 may determine and configure a gateway device's DHCP lease time for the LAN devices.

SPV operation logic 420 may include any hardware and/or software based logic (e.g., processing logic 220) that may enable ACS 120 to perform a set parameter value (SPV) operation to add a new port forwarding entry in gateway device 130. In one example, SPV operation logic 420 may receive verification information 470 and activation inform message 330 from verification logic 410, and may generate a port forwarding rule (e.g., set port forwarding rule 345) to add a new port forwarding entry in gateway device 130. SPV operation logic 420 may provide set port forwarding rule 345 to gateway device 130 and to connection request logic 430. SPV operation logic 420 (e.g., via forwarding rule 345) may remove an old connection request port forwarding entry (e.g., if it exists) from gateway device 130 using an SPV operation.

Connection request logic 430 may include any hardware and/or software based logic (e.g., processing logic 220) that may enable ACS 120 to add the new port forwarding entry (e.g., a connection request port forwarding entry 480) in gateway device 130 and to allow a connection request operation destined for LAN device 140 to be forwarded correctly by gateway device 130. In one example, connection request logic 430 may receive forwarding rule 345 from SPV operation logic 420, and may retrieve connection request port forwarding entry 480 from database 440 based on forwarding rule 345. In another example, connection request logic 430 may enable ACS 120 to issue a connection request prior to issuing a SPV operation to create a new port forwarding entry. In one implementation, connection request port forwarding entry 480 may include a four-tuple of fields (e.g., an ACS_IP field, a CRPort field, a LANDevice_IP field, and a LANDevice_CRPort field). The ACS_IP field may include an IP address of an ACS (e.g., ACS 120) that may be used by gateway device 130 for communication with ACS 120. The CRPort field may include a connection request port assigned to a gateway device (e.g., gateway device 130) for an associated LAN device (e.g., LAN device 140). The LANDevice_IP field may include a private IP address of a LAN device (e.g., LAN device 140). The LANDevice_CRPort field may include a default connection request port in a LAN device (e.g., LAN device 140). In other implementations, port forwarding entry 480 may include fewer, more, or different fields than the four-tuple of fields described herein.

As further shown in FIG. 4, connection request logic 430 may generate connection request operation 355. Forwarding rule 345 and/or port forwarding entry 480 may permit connection request operation 355, initiated by connection request logic 430 and destined to a selected LAN device (e.g., LAN device 140), to be forwarded correctly by gateway device 130 to LAN device 140. In one implementation, connection request logic 430 may create a new connection request port forwarding entry in gateway device 130 by mapping the four-tuple of fields of port forwarding entry 480 to an assigned port mapping entry (e.g., PortMapping.{i}) of a port forwarding table provided in gateway device 130 as follows:

PortMappingEnabled=True
PortMappingLeaseDuration=0
RemoteHost=ACS_IP
ExternalPort=CRPort
InternalPort=LANDevice_CRPort
PortMappingProtocol=TCP
InternalClient=LANDevice_IP In one implementation, only the ExternalPort and InternalClient values may vary in the entries provided in the port forwarding table of gateway device 130. In another implementation, RemoteHost may include multiple IP addresses. In still another implementation, ACS 120 may issue multiple, similar port forwarding SVP operations for each RemoteHost IP address.

Database 440 may include one or more databases capable of being provided in ACS 120 (e.g., within storage device 250) and/or managed by ACS 120. The information provided in database 440 may be provided by any device in network 100, and/or by any device provided in a network separate from network 100. Database 440 may include a variety of information, such as a pool or repository of gateway device ports assigned for connection request operations to LAN devices (e.g., LAN device 140) associated with a gateway device (e.g., gateway device 130), a table of port forwarding entries associated with the gateway device (e.g., gateway device 130), a table of devices capable of being managed by ACS 120, etc. In one implementation, the pool of gateway device ports may include a port range and a range size of connection request ports per gateway device, and a single port range may be applied to gateway devices managed by ACS 120.

Although FIG. 4 shows exemplary functional components of ACS 120, in other implementations, ACS 120 may contain fewer, different, or additional functional components than depicted in FIG. 4. In still other implementations, one or more functional components of ACS 120 may perform one or more other tasks described as being performed by one or more other functional components of ACS 120. For example, in one implementation, SPV operation logic 420 may perform the functions of connection request logic 430, and connection request logic 430 may be omitted.

Figure 5:
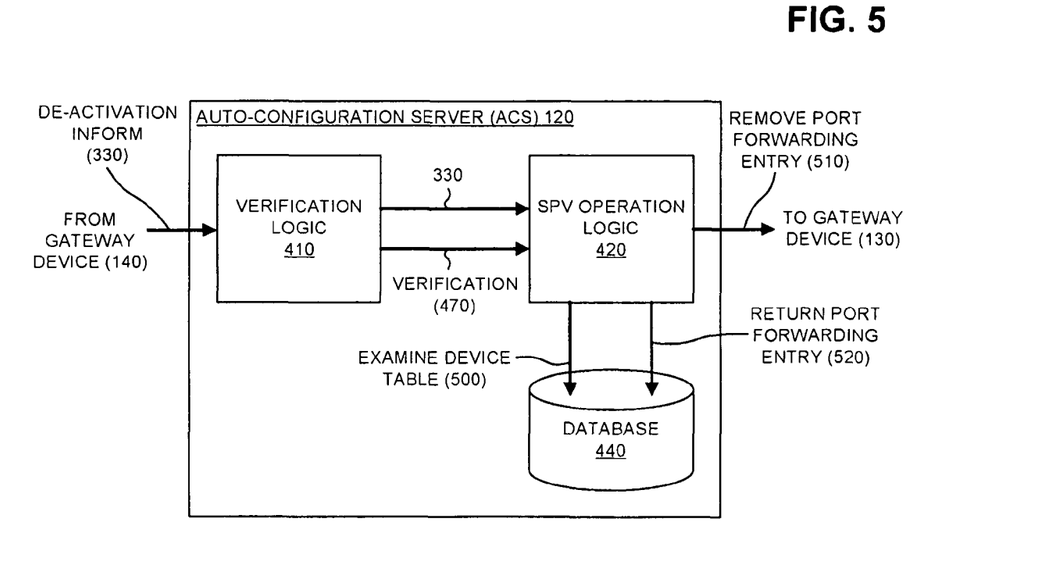
FIG. 5 depicts an exemplary functional block diagram of the ACS of the network illustrated in FIG. 1 during de-activation of a LAN device.

FIG. 5 depicts an exemplary functional block diagram of ACS 120 during de-activation of a LAN device (e.g., LAN device 140). As illustrated, ACS 120 may include verification logic 410, SPV operation logic 420, and/or database 440. Verification logic 410, SPV operation logic 420, and/or database 440 may perform the functions described above in connection with FIG. 4. Remote management decision logic 400 and connection request logic 430 of ACS 120 have been omitted from FIG. 5 for simplicity. The functions described in FIG. 5 may be performed by one or more of the exemplary components of device 200 depicted in FIG. 2.

As shown in FIG. 5, verification logic 410 may receive a de-activation inform message (e.g., inform message 330) if one or more LAN devices (e.g., LAN device 140) are removed from a gateway device (e.g., gateway device 130). In one implementation, de-activation inform message 330 may include notification parameter attributes (e.g., ManageableDeviceNumberOfEntries and ManageableDevice). Verification logic 410 may determine whether an IP address (e.g., for the removed LAN device) in de-activation inform message 330 has changed. If the IP address in de-activation inform message 330 has changed, verification logic 410 may perform a verification of gateway device 130 and the associated LAN device 140. If gateway device 130 and LAN device 140 are verified, verification logic 410 may provide verification information 470 and de-activation inform message 330 to SPV operation logic 420.

SPV operation logic 420 may receive de-activation inform message 330 and verification information 470 from verification logic 410, and may determine if one or more LAN devices have been removed (i.e., de-activated) from a network (e.g., network 100). As set forth in TR-111, determining whether a LAN device is removed from a network depends on the implementation of a gateway device. SPV operation logic 420 may determine whether one or more LAN devices have been removed by examining parameter attribute values of de-activation inform message 330. If SPV operation logic 420 determines that one or more LAN devices have been removed, SPV operation logic 420 may examine a manageable device table provided in database 440 (e.g., as indicated by reference number 500) and may determine which LAN devices have been removed based on the examination of the manageable device table. For each LAN device identified as being removed, SPV operation logic 420 may perform a SPV operation to remove a port forwarding entry in gateway device 130 (e.g., as indicated by reference number 510), and may return the associated port forwarding entry (e.g., a CR_Port value) back to the pool of gateway device ports provided in database 440 (e.g., as indicated by reference number 520).

In certain instances, a gateway device (e.g., gateway device 130) may undergo a factory reset initiated either by an end user or via ACS 120. After a factory reset, ACS 120 (e.g., SPV operation logic 420) may examine the manageable device table of the particular gateway device, and may add the port forwarding entries associated with the LAN devices currently being managed.

Although FIG. 5 shows exemplary functional components of ACS 120, in other implementations, ACS 120 may contain fewer, different, or additional functional components than depicted in FIG. 5. In still other implementations, one or more functional components of ACS 120 may perform one or more other tasks described as being performed by one or more other functional components of ACS 120.

Figure 6:
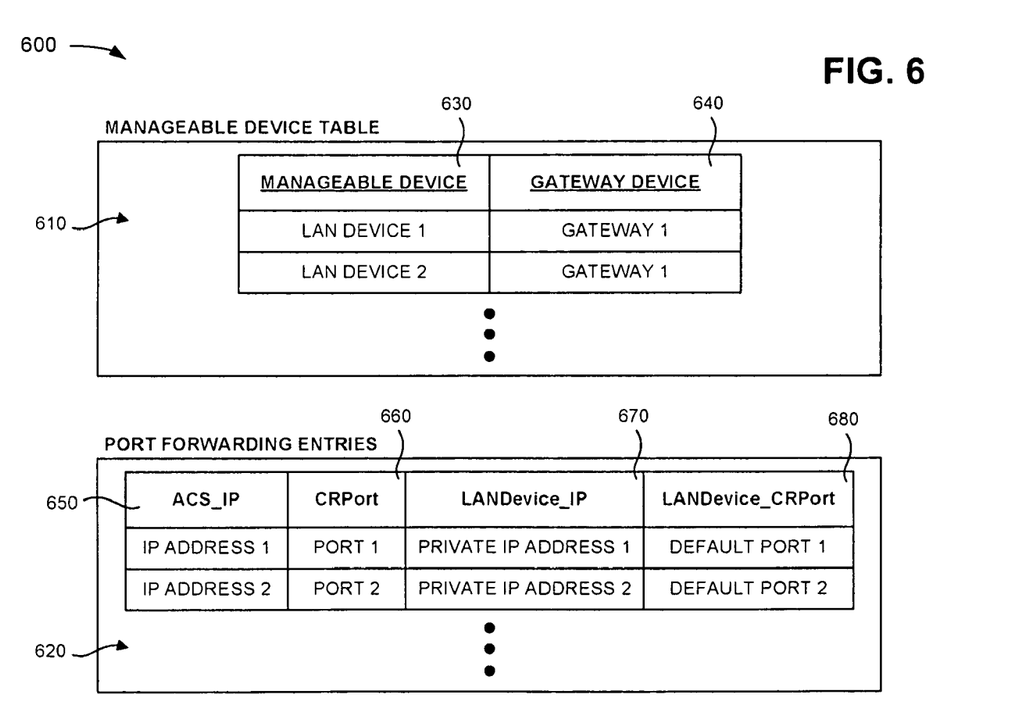
FIG. 6 illustrates an exemplary portion of a database capable of being provided in the ACS depicted in FIGS. 4 and 5.

FIG. 6 illustrates a portion 600 of an exemplary database capable of being provided in ACS 120 (e.g., within database 440) and/or managed by ACS 120. The information provided in database portion 600 may be provided by any device in network 100, and may be used by any device of network 100. As illustrated, database portion 600 may include a variety of device remote management information, such as a manageable device table 610 and a port forwarding entries table 620.

Manageable device table 610 may include a table of information associated with one or more devices capable of being managed by ACS 120 and/or associated with gateway devices. In one implementation, manageable device table 610 may include, for example, a manageable device field 630 and an associated gateway device field 640. Manageable device field 630 may provide a list of devices (e.g., including LAN device 140) that are capable of being managed by ACS 120. For example, manageable device field 630 may include an entry for "LAN DEVICE 1" and an entry for "LAN DEVICE 2." Gateway device field 640 may provide a list of gateway devices (e.g., including gateway device 130) associated with the list of devices provided in manageable device field 630. For example, gateway device field 640 may provide two entries for "GATEWAY 1," which may indicate that this gateway device is associated with the two LAN devices provided in manageable device field 630.

Port forwarding entries table 620 may include a table of information associated with port forwarding entries used by ACS 120 to remotely manage one or more LAN devices. In one implementation, port forwarding entries table 620 may include, for example, an ACS_IP field 650, a CRPort field 660, a LANDevice_IP field 670, and/or a LANDevice_CR-Port field 680 (e.g., which may correspond to the four-tuple of fields described above in connection with port forwarding entry 480 of FIG. 4). ACS_IP field 650 may include IP addresses (e.g., "IP ADDRESS 1" and "IP ADDRESS 2") of ACSs (e.g., ACS 120) that may be used by gateway device 130 for communicating with ACS 120. CRPort field 660 may include connection request ports (e.g., "PORT 1" and "PORT 2") assigned to gateway devices (e.g., gateway device 130) for associated LAN devices (e.g., LAN device 140). LANDevice_IP field 670 may include private IP addresses (e.g., "PRIVATE IP ADDRESS 1" and "PRIVATE IP ADDRESS 2") of LAN devices (e.g., LAN device 140). LANDevice_CRPort field 680 may include default connection request ports (e.g., "DEFAULT PORT 1" and "DEFAULT PORT 2") in LAN devices (e.g., LAN device 140).

Although FIG. 6 shows exemplary information that may be provided in database portion 600, in other implementations, database portion 600 may contain fewer, different, or additional information than depicted in FIG. 6.

Figure 7:
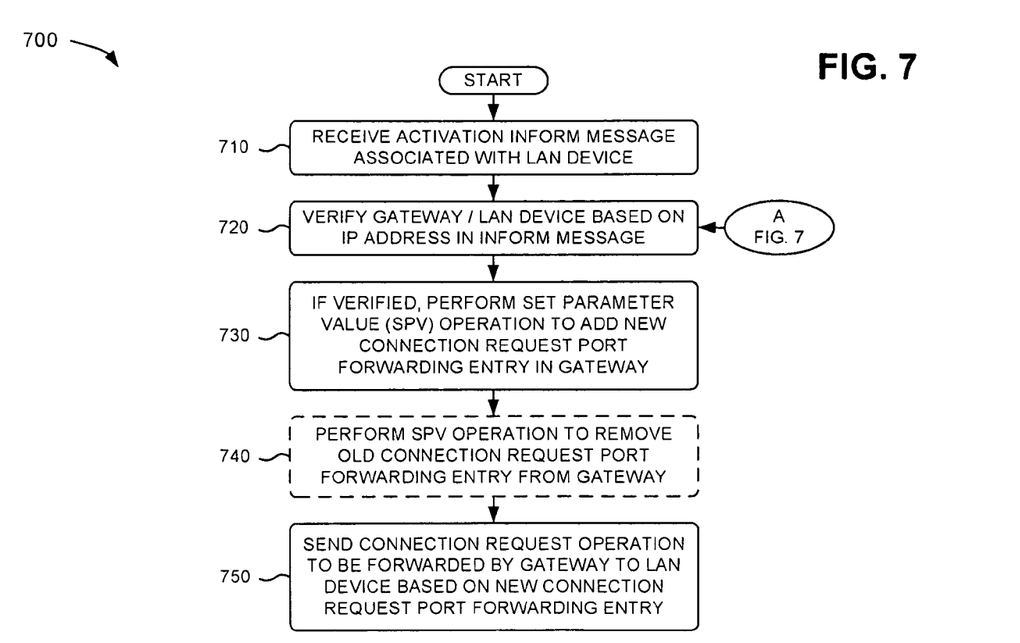
FIGS. 7-10 depict flow charts of exemplary processes according to implementations described herein.
Figure 8:
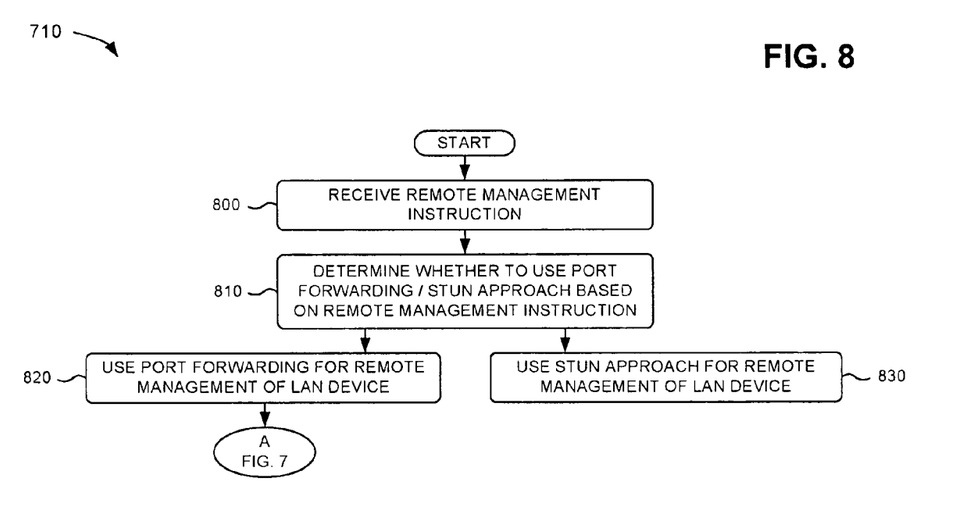
Figure 9:
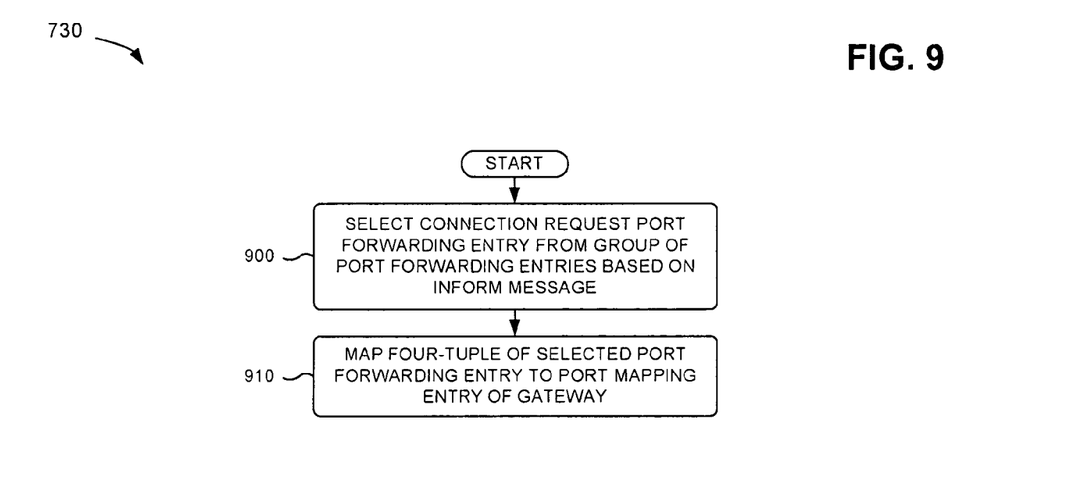

FIGS. 7-9 depict a flow chart of an exemplary process 700 for activating a new connection request port forwarding entry in a gateway device and sending a connection request operation, according to implementations described herein. In one implementation, process 700 may be performed by ACS 120. In another implementation, some or all of process 700 may be performed by another device or group of devices, including or excluding ACS 120.

As illustrated in FIG. 7, process 700 may begin with receipt of an activation inform message associated with a LAN device (block 710), and verification of a gateway device and/or the LAN device based on an IP address in the activation inform message (block 720). For example, in implementations described above in connection with FIG. 4, verification logic 410 of ACS 120 may receive an activation inform message (e.g., inform message 330) associated with a LAN device (e.g., LAN device 140), and may determine whether an IP address (e.g., for the LAN device) in the activation inform message has changed. If the IP address in the activation inform message has changed, verification logic 410 may perform a verification of gateway device 130 and the associated LAN device 140.

As further shown in FIG. 7, if the gateway device and/or LAN device are verified, a set parameter value (SPV) operation may be performed to add a new connection request port forwarding entry in the gateway device (block 730). For example, in implementations described above in connection with FIG. 4, SPV operation logic 420 of ACS 120 may receive verification information 470 and activation inform message 330 from verification logic 410, and may generate a port forwarding rule (e.g., set port forwarding rule 345) to add a new port forwarding entry in gateway device 130. SPV operation logic 420 may provide set port forwarding rule 345 to gateway device 130 and to connection request logic 430 of ACS 120. Connection request logic 430 may enable ACS 120 to issue a connection request prior to issuing a SPV operation to create a new port forwarding entry in gateway device 130 by mapping the four-tuple of fields of port forwarding entry 480 to an assigned port mapping entry (e.g., PortMapping.{i}) of a port forwarding table provided in gateway device 130.

Returning to FIG. 7, an optional SPV operation may be performed to remove an old connection request port forwarding entry in the gateway device (block 740). For example, in implementations described above in connection with FIG. 4, SPV operation logic 420 of ACS 120 (e.g., via forwarding rule 345) may remove an old connection request port forwarding entry (e.g., if it exists) from gateway device 130 using an SPV operation.

As further shown in FIG. 7, a connection request operation to be forwarded by the gateway device to the LAN device may be sent based on the new connection request port forwarding entry (block 750). For example, in implementations described above in connection with FIG. 4, connection request logic 430 of ACS 120 may generate connection request operation 355. Forwarding rule 345 and/or port forwarding entry 480 may permit connection request operation 355, initiated by connection request logic 430 and destined to a selected LAN device (e.g., LAN device 140), to be forwarded correctly by gateway device 130 to LAN device 140. If the connection request operation is successfully forwarded by gateway device 130 to LAN device 140, LAN device 140 may activated for remote management by ACS 120. In one example, ACS 120 may remotely manage by auto-configuring LAN device 140 for advanced services in a known manner.

Process block 710 may include the process blocks illustrated in FIG. 8. Alternatively, the process blocks depicted in FIG. 8 may be performed separately from process block 710. As shown in FIG. 8, process block 710 may include receiving a remote management instruction (block 800), and determining whether to use port forwarding or a STUN approach based on the remote management instruction (block 810). For example, in implementations described above in connection with FIG. 4, remote management decision logic 400 of ACS 120 may provide device activation message 335 (e.g., that may provide information associated with gateway device 130 and/or LAN device 140) to OSS 110, and OSS 110 may receive device activation message 335. OSS 110 may provide remote management instruction 450 (e.g., instructing whether to use port forwarding or STUN) to remote management decision logic 400. Remote management decision logic 400 may determine whether to use port forwarding or the STUN approach based on remote management instruction 450. In one example, remote management decision logic 400 may use port forwarding in situations when LAN device 140 has limited memory resources for incorporation of a STUN agent, when extraneous features in STUN are not required, and/or when the potential security risk is too great. In another example, remote management decision logic 400 may use the STUN approach when LAN device 140 has sufficient memory resources for incorporation of the STUN agent and/or upon discovery of a NAT-enabled gateway device that is not managed by ACS 120.

As further shown in FIG. 8, if it is determined to use port forwarding (block 810), port forwarding may be used for remote management of the LAN device (block 820) and process block 710 may proceed to process block 720 (FIG. 7). If it is determined to use the STUN approach (block 810), the STUN approach may be used for remote management of the LAN device (block 830). For example, in implementations described above in connection with FIG. 4, if OSS 110 instructs ACS 120 to use port forwarding, remote management instruction 450 may include use port forwarding instruction 340, and remote management decision logic 400 may provide verification logic 410 instruction 460 to use port forwarding. If OSS 110 instructs ACS 120 to use the STUN approach, remote management instruction logic 450 may provide verification logic 410 an instruction to use the STUN approach. In this situation, a pinhole may be opened on the gateway device (e.g., gateway device 130) in a known manner.

Process block 730 may include the process blocks illustrated in FIG. 9. As shown in FIG. 9, process block 730 may include selecting the connection request port forwarding entry from a group of port forwarding entries based on the activation inform message (block 900), and mapping a four-tuple of the selected port forwarding entry to a port mapping entry of the gateway device (block 910). For example, in implementations described above in connection with FIGS. 4 and 6, connection request logic 430 of ACS 120 may receive forwarding rule 345 from SPV operation logic 420, and may retrieve a port forwarding entry 480 from database 440 (e.g., from port forwarding entries table 620) based on forwarding rule 345. Connection request logic 430 may enable ACS 120 to issue a connection request prior to issuing a SPV operation to create a new connection request port forwarding entry in gateway device 130 by mapping the four-tuple of fields of port forwarding entry 480 to an assigned port mapping entry (e.g., PortMapping.{i}) of a port forwarding table provided in gateway device 130.

Figure 10:
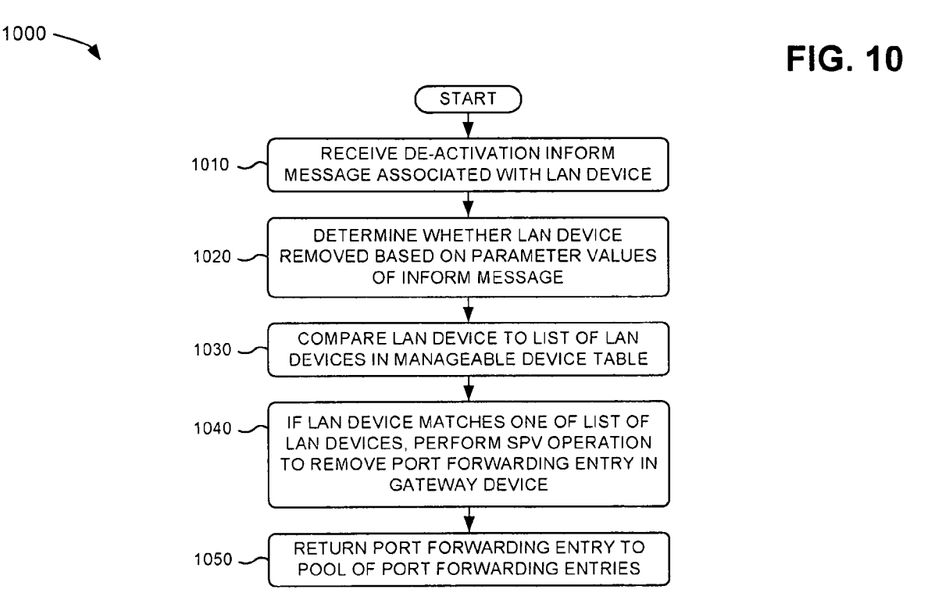

FIG. 10 depicts a flow chart of an exemplary process 1000 for de-activating a LAN device associated with a gateway device, according to implementations described herein. In one implementation, process 1000 may be performed by ACS 120. In another implementation, some or all of process 1000 may be performed by another device or group of devices, including or excluding ACS 120.

As illustrated in FIG. 10, process 1000 may begin with receipt of a de-activation inform message associated with a LAN device (block 1010), and a determination of whether the LAN device is removed based on parameter values of the de-activation inform message (block 1020). For example, in implementations described above in connection with FIG. 5, verification logic 410 of ACS 120 may receive a de-activation inform message (e.g., inform message 330) if one or more LAN devices (e.g., LAN device 140) are removed from a gateway device (e.g., gateway device 130). In one example, de-activation inform message 330 may include notification parameter attributes (e.g., ManageableDeviceNumberOfEntries and ManageableDevice). If gateway device 130 and LAN device 140 are verified, verification logic 410 may provide verification information 470 and de-activation inform message 330 to SPV operation logic 420 of ACS 120. SPV operation logic 420 may receive de-activation inform message 330 and verification information 470 from verification logic 410, and may determine if one or more LAN devices have been removed (i.e., de-activated) from a network (e.g., network 100) by examining parameter attribute values of de-activation inform message 330.

As further shown in FIG. 10, the LAN device may be compared to a list of LAN devices contained in a manageable device table (block 1030), and if the LAN device matches one of the list of LAN devices, a set parameter value (SPV) operation may be performed to remove a port forwarding entry in a gateway device associated with the LAN device (block 1040). For example, in implementations described above in connection with FIG. 5, if SPV operation logic 420 determines that one or more LAN devices have been removed, SPV operation logic 420 may examine a manageable device table provided in database 440 (e.g., as indicated by reference number 500) and may determine which LAN devices have been removed based on the examination of the manageable device table. For each LAN device identified as being removed, SPV operation logic 420 may perform a SPV operation to remove a port forwarding entry in gateway device 130 (e.g., as indicated by reference number 510).

Returning to FIG. 10, the port forwarding entry removed from the gateway device may be returned to a pool of port forwarding entries (block 1050). For example, in implementations described above in connection with FIG. 5, for each LAN device identified as being removed, SPV operation logic 420 may return the associated port forwarding entry (e.g., a CR_Port value) back to the pool of gateway device ports provided in database 440 (e.g., as indicated by reference number 520).

Implementations described herein may use port forwarding rules in a gateway device to provide a connection request operation (e.g., initiated by an auto-configuration server) a way to reach a LAN device attached to the gateway device. Implementations described herein may forgo use of STUN, may minimize unnecessary network traffic, may provide a more secure solution than STUN, and may permit use of a TCP for connection requests, as opposed to UDP used in STUN.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-10, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
receiving, by the computing device, an activation inform message associated with a local area network device;
verifying, by the computing device, the local area network device and a gateway device associated with the local area network device based on an Internet protocol address included in the activation inform message;
selecting, by the computing device, a new connection request port forwarding entry from a plurality of port forwarding entries based on the activation inform message;
mapping, by the computing device, one or more fields of the new connection request port forwarding entry to a port mapping entry of the gateway device, the new connection request port forwarding entry including a first field to store an Internet protocol address of the computing device, a second field to store a connection request port assigned to the gateway device for the local area network device, a third field to store a private Internet protocol address of the local area network device, and a fourth field to store a default connection request port of the local area network device;
performing, by the computing device, a set parameter value operation to add the new connection request port forwarding entry in the gateway device when the local area network device and the gateway device are verified;
sending, by the computing device, a connection request operation, to be forwarded by the gateway device, to the local area network device, based on the new connection request port forwarding entry;
receiving a remote management instruction;
determining whether to use port forwarding or a Simple Traversal of User Datagram Protocol Through Network Address Translators approach based on the remote management instruction; and
using one of the port forwarding or the Simple Traversal of User Datagram Protocol Through Network Address Translators approach for remote management of the local area network device based on the determination.

2. The computing-device implemented method of claim 1, further comprising:
performing a set parameter value operation to remove an old connection request port forwarding entry from the gateway device.

3. The computing device-implemented method of claim 1, further comprising:
receiving, by the computing device, a de-activation inform message associated with the local area network device;
comparing, by the computing device, information identifying the local area network device to a list of local area network devices contained in a manageable device table; and
performing, by the computing device, a set parameter value operation to remove the connection request port forwarding entry in the gateway device associated with the local area network device when the information identifying the local area network device matches information in the list of local area network devices.

4. The computing device-implemented method of claim 3, further comprising:
verifying the local area network device and the gateway device associated with the local area network device based on an Internet protocol address included in the de-activation inform message.

5. The computing device-implemented method of claim 3, further comprising:
determining whether the local area network device is removed from a network based on parameter values of the de-activation inform message.

6. The computing device-implemented method of claim 3, further comprising:
returning the connection request port forwarding entry to a pool of available port forwarding entries.

7. A device, comprising:
processing logic to:
receive an activation inform message associated with a local area network device,
verify the local area network device and a gateway device associated with the local area network device based on an Internet protocol address included in the activation inform message,
select a new connection request port forwarding entry from a plurality of port forwarding entries based on the activation inform message,
map one or more fields of the new connection request port forwarding entry to a port mapping entry of the gateway device, the new connection request port forwarding entry including a first field to store an Internet protocol address of the device, a second field to store a connection request port assigned to the gateway device for the local area network device, a third field to store a private Internet protocol address of the local area network device, and a fourth field to store a default connection request port of the local area network device,
perform a set parameter value operation to remove an old connection request port forwarding entry from the gateway device;
perform a set parameter value operation to add the new connection request port forwarding entry in the gateway device when the local area network device and the gateway device are verified, and
send a connection request operation, to be forwarded by the gateway device to the local area network device, based on the new connection request port forwarding entry.

8. The device of claim 7, where the local area network device comprises at least one of:
a customer premises equipment device;
a private branch exchange;
a set-top box;
a home router; or
a voice over Internet protocol based device.

9. The device of claim 7, where the gateway device comprises at least one of:
a Network Address Translator enabled gateway device;
a customer premises equipment device;
a broadband network termination;
a broadband router;
a switch;
a firewall;
a network interface card;
a hub;
a bridge; or
a proxy server.

10. The device of claim 7, where, when mapping the one or more fields of the new connection request port forwarding entry to the port mapping entry of the gateway device, the processing logic is further to:

map the first field, the second field, the third field, and the fourth field of the new connection request port forwarding entry to a port mapping entry of the gateway device.

11. The device of claim 7, where the processing logic is further to:
receive a de-activation inform message associated with the local area network device,
compare information identifying the local area network device to a list of local area network devices contained in a manageable device table, and
perform a set parameter value operation to remove a connection request port forwarding entry in a gateway device associated with the local area network device when the information identifying the local area network device matches information in the list of local area network devices.

12. The device of claim 11, where the processing logic is further to:
verify the local area network device and the gateway device based on an Internet protocol address included in the de-activation inform message.

13. The device of claim 11, where the processing logic is further to:
determine whether the local area network device is removed from a network based on parameter values of the de-activation inform message.

14. The device of claim 11, where the processing logic is further to:
return the connection request port forwarding entry to a pool of available port forwarding entries.

15. The device of claim 7, where the device comprises an auto-configuration server that auto-configures the local area network device for advanced services.

16. A system, comprising:
means for receiving an activation inform message associated with a local area network device;
means for verifying the local area network device and a gateway device associated with the local area network device based on an Internet protocol address included in the activation inform message;
means for selecting a new connection request port forwarding entry from a plurality of port forwarding entries based on the activation inform message;
means for mapping one or more fields of the new connection request port forwarding entry to a port mapping entry of the gateway device, the new connection request port forwarding entry including a first field to store an Internet protocol address of the system, a second field to store a connection request port assigned to the gateway device for the local area network device, a third field to store a private Internet protocol address of the local area network device, and a fourth field to store a default connection request port of the local area network device;
means for performing a set parameter value operation to add the new connection request port forwarding entry in the gateway device when the local area network device and the gateway device are verified;
means for sending a connection request operation, to be forwarded by the gateway device to the local area network device, based on the new connection request port forwarding entry;
means for performing a set parameter value operation to remove an old connection request port forwarding entry from the gateway device;
means for receiving a remote management instruction;
means for determining whether to use port forwarding or a Simple Traversal of User Datagram Protocol Through Network Address Translators approach based on the remote management instruction; and
means for using one of port forwarding or the Simple Traversal of User Datagram Protocol Through Network Address Translators approach for remote management of the local area network device based on the determination.

17. A non-transitory computer-readable medium storing instructions, the instructions comprising:
one or more instructions which, when executed by one or more processors, cause the one or more processors to:
receive an activation inform message associated with a local area network device,
verify the local area network device and a gateway device associated with the local area network device based on an Internet protocol address included in the activation inform message,
select a new connection request port forwarding entry from a plurality of port forwarding entries based on the activation inform message,
map one or more fields of the new connection request port forwarding entry to a port mapping entry of the gateway device, the new connection request port forwarding entry including a first field to store an Internet protocol address of the device carrying said instructions, a second field to store a connection request port assigned to the gateway device for the local area network device, a third field to store a private Internet protocol address of the local area network device, and a fourth field to store a default connection request port of the local area network device,
perform a set parameter value operation to remove an old connection request port forwarding entry from the gateway device,
perform a set parameter value operation to add the new connection request port forwarding entry in the gateway device when the local area network device and the gateway device are verified, and
send a connection request operation, to be forwarded by the gateway device to the local area network device, based on the new connection request port forwarding entry.

18. The computer-readable medium of claim 17, where the one or more instructions to map the one or more fields of the new connection request port forwarding entry to the port mapping entry of the gateway device include:
one or more instructions to map the first field, the second field, the third field, and the fourth field of the new connection request port forwarding entry to a port mapping entry of the gateway device.

* * * * *